Dec. 9, 1958 E. L. JOSEFOWICZ 2,863,546
MAGNETIC FLUX MONITORING APPARATUS
Filed March 19, 1956 2 Sheets-Sheet 1
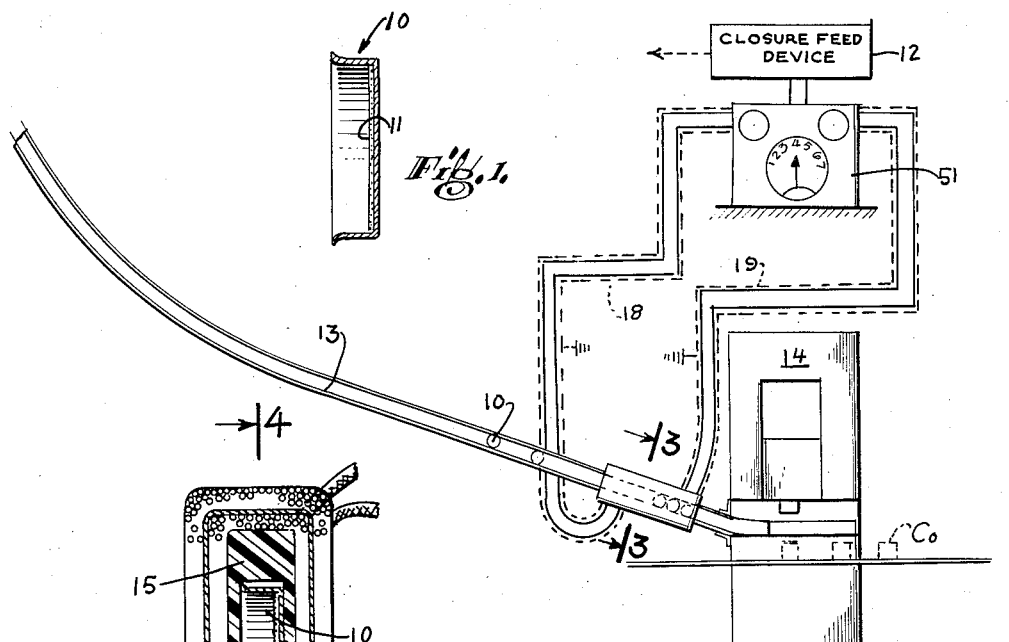
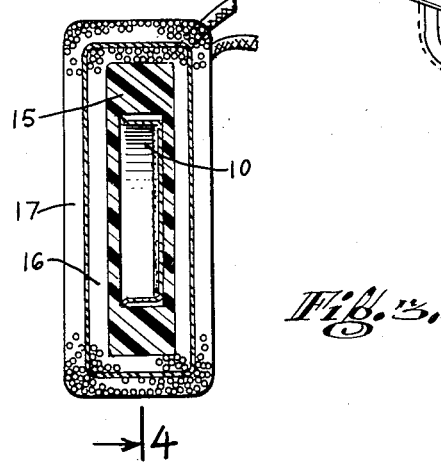
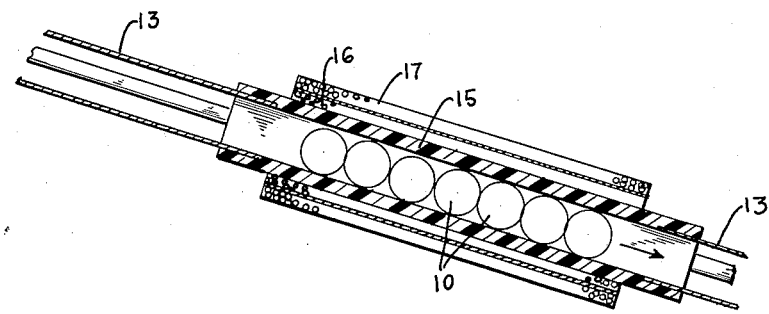
INVENTOR
Edmund L. Josefowicz
BY
Kenyon & Kenyon
ATTORNEYS Dec. 9, 1958  E. L. JOSEFOWICZ  2,863,546
MAGNETIC FLUX MONITORING APPARATUS
Filed March 19, 1956  2 Sheets-Sheet 2

INVENTOR
Edmund L. Josefowicz
BY
ATTORNEYS

United States Patent Office 2,863,546
Patented Dec. 9, 1958

2,863,546

MAGNETIC FLUX MONITORING APPARATUS

Edmund L. Josefowicz, Bayonne, N. J., assignor to The Best Foods, Inc., New York, N. Y., a corporation of New Jersey Application March 19, 1956, Serial No. 572,261

2 Claims. (Cl. 193—32)

This invention relates to apparatus for monitoring or controlling the operation of a device that supplies or feeds metallic parts to a runway or power driven conveyor, and more particularly to apparatus for monitoring or controlling the flow or feed of metallic closures or caps to a runway that serves to deliver them to container closing or capping machinery.

In container capping or closing operations a paucity of or an excess supply of closure members or caps for the containers at their point of application to the latter causes problems among which are failure of container closing when the supply of closures does not match the number of containers to be closed, or waste and possible jamming of closures when oversupply occurs.

In the past, attempts at automatic monitoring or control to alleviate these problems have involved the use of electrical switches in conjunction with the closure runway. These switches were intended to be actuated mechanically by the weight of an accumulation of closures on the runway. The actuation of the switches shut off the feed device that fed closures to the runway. In practice, however, these switches frequently failed to operate properly or at the right time because of vibrations created by the moving closures, or because of temperature changes or other factors which necessitated frequent stoppage for adjustment with resultant expense and loss of production.

The present invention has for its principal objects and features the provision of monitoring or control apparatus that will overcome the foregoing problems in an entirely feasible and acceptable manner and which may be utilized easily and simply with existing machinery in replacement for the mechanically operated electrical switching arrangements hereinabove mentioned.

Other objects and features of the invention are the provision of automatic monitoring or control apparatus for closures that operates by utilization of magnetic flux and of changes in the latter resulting from action thereon of the closures in their transit along the runway for application to containers.

In practicing the invention, the closures or caps pass through an insulated, electrically non-conductive section or portion of a runway containing a magnetic field. This magnetic field is developed or created by inductively coupled coils surrounding the insulated portion of the runway. The presence of a determined number of closures in this magnetic field causes a change of magnetic flux of the field with a simultaneous change of current flow through the coils. An electric circuit and components associated with the coils but remotely positioned relative thereto detect the changes in current flow and control the action of suitable relays. These relays, in turn, for example control operation of an electric motor that drives the device which feeds closures to the runway, or any other type of mechanism that affects feed of the closures to the runway.

Other objects and features of the invention include the provision of an arrangement and electric circuitry which utilizes alternating electric current at values that are not sufficient either to produce inductive heating either in the metal closures or in the coils, or to impede forward movement of the closures by reason of magnetic attraction.

Further objects and features of the invention are to provide an arrangement that is operable successfully without utilizing external means for voltage regulation, notwithstanding the fact that the line supply voltage may be subject to appreciable fluctuation.

Still additional objects and features of the invention are the provision of an arrangement that is capable of continuous operation for long periods of time without failure.

Further objects and features of the invention are the provision of means for adjusting the circuits with respect to the feed of closure members so that the presence of any determined number of such members in the magnetic field will effect monitoring or control operations.

Further objects and features of the invention are the provision of an arrangement that embodies simplicity of design, has substantially instantaneous operative response characteristics, that is free of maintenance problems and which, also, is free of shock hazards to users thereof.

Other objects and features of the invention will become apparent from the following specification and the accompanying drawings wherein:

Figure 1 is a transverse or diametrical section through a container closure or cap member, the automatically controlled feed of which is desired;

Figure 2 is a diagrammatic view of a closure receiving runway in relation to a conventional container closing machine wherein the closures delivered from the runway are applied to containers and in which runway the electrically non-conductive portion providing a magnetic field for the monitoring or control purposes of this invention is included;

Figure 3 is a transverse section taken along line 3—3 of Fig. 2 of the said electrically non-conductive portion of the runway;

Figure 4 is a longitudinal section taken along line 4—4 of Fig. 3; and

Figure 5:
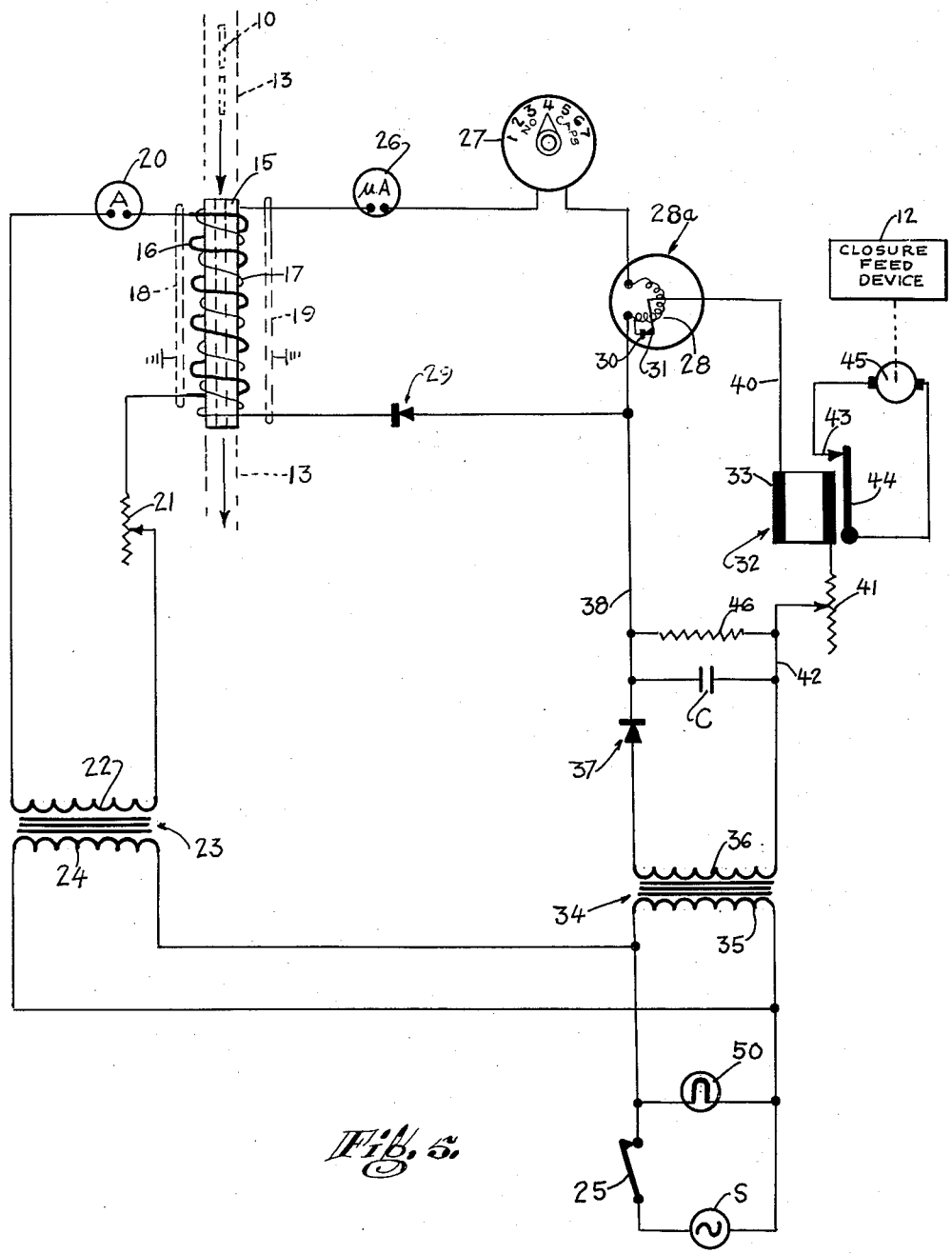
Figure 5 is an electric circuit diagram illustrating the general manner of practicing the invention.

Referring to the drawings, the reference character 10 denotes generally metallic closures or caps the feed of which are to be monitored and controlled. These closures or caps 10 are conventional, being usually round and either of the screw cap type or of the pressure sealing type. Generally, such closures are made of sheet iron plated with tin, brass or other plating or coating material. They include also an inner lining disk or gasket 11 generally of wax impregnated cardboard or of other suitable gasket material.

These closures 10 are fed by a motor controlled device, illustrated diagrammatically only and designated by the reference character 12 to the receiving end of a gravity feed, downwardly extending metal runway or chute 13. The cross section of the runway is so shaped that the closures delivered to it roll downwardly in it in a substantially vertical plane. This runway 13 serves to deliver the closures 10 to the container closing device 14. The latter is of any conventional type that successively applies an individual closure arriving at the delivery end of the runway 13 to an individual container Co.

Intermediate its receiving and delivery ends, the runway 13 is provided with a body portion 15 of insulative or non-conductive material constructed, for example, of paper impregnated with phenol formaldehyde resin, or of any other suitable non-conductive insulative substance. This body portion 15 is constructed so that its internal cross sectional dimensions are substantially the same as those of the other portions of the runway 13 so that the installation of the portion 15 in runway 13 will not impair movement of said closures 10 from the receiving to the delivery ends of said runway.

A primary coil 16 is wound closely about the external surface of the insulated runway body portion 15 and in the embodiment shown consists of about 1100 turns of insulated #23 magnet wire. Another, or secondary coil 17 of the same wire is wound on top of and closely around the first coil 16 and in the same direction. These two coils are thus inductively coupled together. The leads from the two coils are shielded from each other by conventional shielding arrangements, illustrated diagrammaitcally at 18 and 19 in Figs. 2 and 5.

As seen in Fig. 5, the shielded input leads of the primary coil 16 are connected serially to an ammeter 20, to a potentiometer 21 (in this instance of 100 ohm rating), and to the output leads of a secondary winding 22 of a step-down transformer 23 intended in this example to supply alternating current at 6.3 volts when its primary winding 24 is connected to a 115 volt 60 cycle A. C. source S through the closure of an on and off source switch 25.

The shielded output leads of the secondary coil 17 are connected to the series arranged microammeter 26, the potentiometer 27 (in this instance of approximately 10,000 ohms resistance), the operating coil 28 of a D. C. galvanometer type relay 28a and a rectifier device 29, in this instance a selenium rectifier of 300 mil rating, arranged with its polarity as shown in Fig. 5. The D. C. galvanometer type relay 28a is of conventional construction and includes a stationary contact 30 connected to one terminal of its operating coil 28 and, also, a movable contact 31. Movable contact 31 normally is in circuit closed condition with stationary contact 30 when no current below a determined D. C. value flows in operating coil 28. Contact 31 is moved away from contact 30 by D. C. current flow in operating coil 28 which is above said determined value. A commercially available D. C. galvanometer utilized in a practical embodiment of this invention had an operational range of 0–100 microamperes. Current flow below 40 microamperes did not separate the contacts 30 and 31. Current flow of over 40 microamperes and up to 100 microamperes acted to separate the contacts 30 and 31 and provide circuit open condition between them.

The contacts 30 and 31 of the galvanometer relay 28a function to control the operation of a small power relay 32 of conventional type, whose operating coil 33 is adapted to be energized by rectified current derived from an independent power supplying step-down transformer 34 of the same rating as the step-down transformer 23. The primary winding 35 of the step-down transformer 34 is connected in phase with the primary winding 24 of the first-named step-down transformer 23 to the same power source S through said on and off switch 25. The secondary winding 36 has one of its output leads connected to a rectifier 37 of like kind and rating to the rectifier 29 and with polarity as indicated in Fig. 5. The rectifier 37, in turn, is connected via wire 38 to the fixed contact 30 of the galvanometer relay 29. The movable contact 31 of galvanometer relay 28a is connected via wire 40 to one lead of the operating coil 33 of the small power relay 32. The other lead of operating coil 33 is connected serially to a current controlling potentiometer 41, herein of approximately 50 ohm rating, and the latter by wire 42 is connected to the second lead of transformer secondary winding 36. The relay 32 has a fixed contact 43 and a movable contact 44 which are in circuit closing condition only as long as operating coil 33 is energized by D. C. current flow therethrough. These contacts 43 and 44 are connected, for example, in the electric circuit of a closure feed operating motor 45 associated with the closure feed device 12 so that said motor runs only while contacts 43 and 44 are engaged and in circuit closed condition.

A filter condenser C, herein, of approximately 150 mfd., 150 volt rating, and the bleeder and stabilizer resistor 46, herein of 5000 ohm rating, are connected in parallel across the wires 38 and 42 and serve as a filter network for the rectified current that is transmitted by rectifier 37 from transformer 34 in conventional manner. A signal light 50 is connected in parallel with transformer primaries 24 and 35 so as to light when switch 25 is closed and thus indicate that power is on and that the circuits are in operating condition.

Operation

Operation is as follows: Closure of line switch 25 energizes the primaries 24 and 35 of both transformers 23 and 34. The alternating current output of transformer 23 is delivered from its secondary winding 22 to the primary detecting coil 16 on body form 15 through which the metallic closures 10 are moving. This small alternating current in primary detecting coil 16 is adjusted to approximately 3 volts, at 60 cycles and 100 milliamperes by potentiometer 21. It is not sufficient to produce inductive heating either of closures 10 or of the detecting coils 16 or 17. This small A. C. current flow in coil 16 which is inductively coupled to coil 17, induces a current in secondary detecting coil 17 which is rectified in its flow through rectifier 29. The small rectified current which is of the order of from 10 to 100 microamperes at 1.5 volts flows through the operating coil 28 of the galvanometer relay 28a. The value of the D. C. current flow through the operating coil 28 may be adjusted as desired by manipulation of the potentiometer 27 so that the presence of less than a determined number of closures 10 in the insulated portion or body 15 within the flux fields of the detecting coils 16 and 17 is insufficient to cause any deflection of the movable operating coil 28 of galvanometer relay 28a. In consequence, contacts 30 and 31 are then in circuit closed condition.

As a result, rectified current delivered by the secondary 36 of the power relay transformer 34 through rectifier 37 may then flow via wire 38, closed contacts 30 and 31, the operating coil 33 of the power relay 32 and potentiometer 41 at a value sufficient to maintain circuit closed conditions at the contacts 43 and 44 of the power relay 32. In consequence, as long as the number of closures within the ambit of the fields of detecting coils 16 and 17 in body portion 15 remains below the number for which adjustment has been made by the setting of the potentiometer 27, the operation of the closure feeding device 12 by its motor 45 will not be interrupted.

As soon, however, as the number of closures in the section 15 within the ambit of the fields of detecting coils 16 and 17 exceeds the number for which adjustment has been made on potentiometer 27, such excessive number of closures causes changes in the magnetic flux conditions in the fields of the detecting coils 16 and 17 and increases the rectified current flow in the described circuit of secondary detecting coil 17. This increased rectified current flows through the operating coil 28 of the galvanometer relay 28a and is sufficient to cause a deflecting movement of the latter and with it the movable contact 31. This causes a break or separation between galvanometer relay contacts 30 and 31. This break halts rectified current flow from power transformer 36 through the power relay operating coil 33. As a result, the power relay contacts 43 and 44 separate and interrupt the circuit of closure feed motor 45 causing it to stop and thus prevent further feed of closures to the runway 13 from feed device 12 until the number of closures in section 15 again is at or below the value for which adjustment of potentiometer 27 has been made. The particular relay 28a utilized requires a current flow of above 40 microamperes in coil 28 to effect a circuit opening deflecting movement of contact 31 relative to contact 30.

Maximum current flow through coil 28 is limited to 100 microamperes. In operation, current flow of from 0–40 microamperes causes no deflecting movement of coil 28, while current flow above 40 to the limit of 100 microamperes causes circuit opening deflection. Current flow within the first range occurs when the number of closures is less than the number for which adjustment has been made on potentiometer 27. Current flow in the second range occurs if the closures exceed this number.

For example, if the potentiometer 27 has been adjusted to cause deflecting motion of galvanometer relay coil 28 whenever more than seven closures are in the body portion 15, then, if less than seven closures are in said body portion 15 and actually moving therethrough to the container closing machine, the feed of closures 10 from device 12 to the runway 13 will continue. However, if movement of the closures through the runway 13 is halted at its delivery end to the container closing machine 14 for any reason such as a mechanical difficulty in said machine, the closures 10 will accumulate on the runway 13 and in the detecting body portion 15 and eventually exceeding seven in said section. When this condition occurs the galvanometer relay contacts 30 and 31 separate, deenergizing power relay coil 33. The closure feeding motor 45 then stops because relay power contacts 41 and 42 open and closure feed by device 12 to the runway 13 is interrupted. When the closure machine 14 resumes operation and the backed-up closures in detecting section 15 again fall below seven, the circuit closed condition of power relay contacts 43 and 44 is restored automatically because galvanometer relay contacts 30 and 31 reengage. Closure feed motor 45 thus again is put into action and closure feeding operation of device 12 is resumed so that closures 10 are again fed to the upper or receiving end of runway 13. The components and arrangements described constitute a magnetic flux switching mechanism responsive to changes in magnetic flux conditions caused by closures in the detecting section 15.

It is to be noted that the system uses small currents and voltages at a determined frequency. This permits successful operation without requiring any external voltage regulation. Industrial line voltages are subject to appreciable fluctuation. However, the electrical characteristics of the magnetic flux switching arrangement of this invention are such that such line fluctuation does not affect normal operation. For example, a line voltage drop of 15 volts in a 115 volt A. C. line source at S would represent a 13% drop. This percentage of 1.5 volts rectified A. C. flowing in the galvanometer type relay 28a would be 0.195 volt or 20 milliwatts at 100 microamperes. Since the range of operation of the said relay 28a is selected to be in the order of 75 milliwatts on either side of the circuit make or break condition at contacts 30 and 31, normal operation is unaffected by even an abnormal line voltage fluctuation as high as 13%.

In addition, the small alternating current from transformer 23, approximately 3 volts at 60 cycles at 100 milliamperes passing through coil 16 induces a small current in the secondary coil 17 which is rectified by rectifier 29 and yields a small control current of approximately 10–100 microamperes at 1.5 volts for flow through galvanometer operating coil 28. This small D. C. current is well within the maximum rating of the relay 28a and assures continuous operation for long periods of time without failure even though in actual practice the switch is actuated many thousands of times during an eight hour production day.

The small power relay 32 whose actuation is controlled by current flow through the galvanometer relay contacts 30 and 31 derives its energizing current from the separate power supply of the transformer 34 embodied in the circuit as described. The power relay 32 is of a type which requires but 4 volts at 35 milliamperes for energization of its coil 33 which is well within the maximum (65 milliamperes) rating of the galvanometer relay contacts 30 and 31. This too insures long life and trouble free operation of the arrangement.

Another extremely important advantage of the arrangement is that it can be operated entirely without possible failure due to vibration because the two relays 28a and 32 can be positioned conveniently in a housing 51 located at a point sufficiently remote from the feeding device 12, the runway 13 and the closure machine 14 as to be entirely unaffected either by machine vibrations or vibrations caused by passage of the closures 10 through the runway 13. Undesired interference with control operations of the system because of vibrations is thus eliminated.

Further, extremely important advantages and features of the arrangement are the simplicity of its design, the instantaneous nature of its response, the elimination of costly maintenance problems and also because of low voltages and currents the elimination of hazards of electric shock to the operator.

It is to be noted that the polarity connections of the selenium rectifiers 29 and 37 is as shown in Fig. 5. If connections to either rectifier are reversed, then the transformer secondaries 22 and 36 must also be reversed to insure proper directional flow for the rectified currents in the galvanometer relay coil 28, as well as in the power relay coil 33. In addition, while the rectifiers have been specified as preferably selenium rectifiers, other types of rectifiers may be substituted. These may be electronic tube rectifiers or other known types of rectifier devices.

While this invention has been described with particular reference to the feed of closures to a runway leading to a container feeding machine, its utility for monitoring the supply of disk-like metallic members for other purposes to a runway to prevent over supply of the members in the runway is clear.

The current and resistance values and other characterizing features attributed to various components herein are by way of example only and may be varied in accord with specific operating requirements. Variations, likewise, instructural detail and in features of various components within the scope of the appended claims all are possible and are contemplated. There is no intention therefore of limitation to the exact details shown and described.

What is claimed is:

1. Apparatus for controlling feed of metallic members from a feeding device to a runway for delivery via the latter for use as required, comprising a pair of inductively coupled coils surrounding a portion of said runway and through which the members must pass in transit through the runway, an alternating current source connected to energize one of said coils with a determined current, and provide an induced current in the second of said coils, a galvanometer type relay having an operating coil, a potentiometer and a rectifier series connected to said second coil, galvanometer relay contacts normally in circuit closed condition whose separation occurs on flow in said operating coil of rectified current from said second coil above a selected value as determined by said potentiometer, a power relay having an energizing coil and power relay contacts that are normally separated when the latter coil is de-energized, a rectifier, and a potentiometer, an electric circuit serially connecting said galvanometer relay contacts, said last-named rectifier, said last-named potentiometer and said energizing coil to said alternating current source, and an independent control circuit connected to said power relay contacts and maintained in closed condition while the latter contacts are engaged, said energizing coil being energized from said source only as long as said galvanometer relay contacts remain closed by flow of current through said galvanometer operating coil below a selected value, and said galvanometer relay contacts separating when current flow through said operating coil exceeds said selected value and thereby interrupting flow of current from said source through said power relay energizing coil thus effecting separation of said power relay contacts and a break in said control circuit, the exceeding current flow through said galvanometer relay operating coil resulting from the inductive effect of the presence of closures within said runway portion above a selected number.

2. Apparatus for controlling feed of closures from a closure feeding device to a runway for delivery of closures to container closing machinery or the like comprising a pair of inductively coupled coils surrounding a portion of said runway and through which the closures must pass in transit via the runway, an alternating current source connected to energize a first one of the coils with a selected value of alternating current to thereby induce a current in the second of the coils, rectifier means in series with said second coil to rectify the induced current, and a control potentiometer, a galvanometer type relay having an operating coil in series with said rectifier, said potentiometer and said second coil, said relay having a pair of galvanometer relay contacts in normally closed condition which are separable to circuit open condition by flow through the operating coil of rectified induced current above a determined value, a power relay having an energizing coil in series with said pair of galvanometer relay contacts and also connected with said alternating current source means, a current regulating device and a rectifier also in series with said energizing coil, a pair of power relay contacts in normally circuit open condition which are operable to circuit closed condition by energization of said energizing coil, an electric control circuit connected to said power relay contacts and adapted to be closed only when the relay power contacts engage each other, said energizing coil being energized from said source means only as long as said galvanometer relay contacts remain closed at values of rectified current flowing through said galvanometer operating coil below a selected value, and said galvanometer relay contacts separating when current flow through said operating coil exceeds said last-named selected value and thereby interrupting flow of current from said source through the power relay energizing coil, and causing said power relay contacts to separate and break said electric control circuit, said increase in current flow through the galvanometer relay operating coil resulting from the inductive effect of an increase in closures in said runway portion above a selected number.

References Cited in the file of this patent

UNITED STATES PATENTS

| | | |
|---|---|---|
| 2,114,297 | Grover | Apr. 19, 1938 |
| 2,346,589 | Lamb | Apr. 11, 1944 |
| 2,571,576 | Hopkins et al. | Oct. 16, 1951 |